Figure 1:
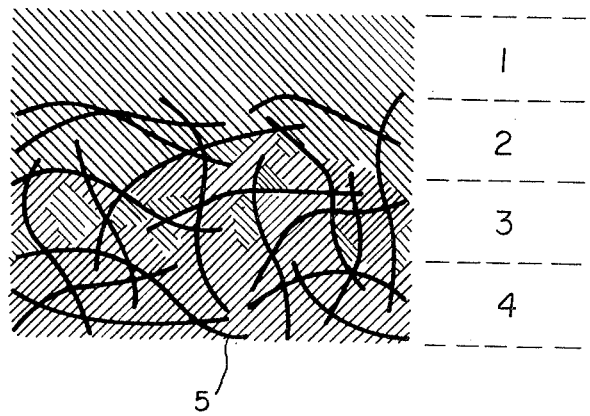

United States Patent

Andra et al.

[15] 3,639,146
[45] Feb. 1, 1972

[54] PROCESS FOR THE PRODUCTION OF A MULTILAYER SHEET MATERIAL

[72] Inventors: Klaus Andra, Eschenhahn; Herbert Porrmann, Konigshofen; Elfriede Hutschenreuter, Wiesbaden-Biebrich, all of Germany

[73] Assignee: Kalle Aktiengesellschaft, Wiesbaden-Biebrich, Germany

[22] Filed: July 29, 1970

[21] Appl. No.: 59,212

[30] Foreign Application Priority Data

July 31, 1969  Germany............P 19 38 990.3

[52] U.S. Cl............117/68, 117/76, 117/135.5, 161/159, 161/164, 161/DIG. 2
[51] Int. Cl............B44d 1/10, D06n 3/00
[58] Field of Search............117/68, 76, 135.5; 161/159, 161/164, DIG. 2

[56] References Cited

UNITED STATES PATENTS

| | | | |
|---|---|---|---|
| 3,262,805 | 7/1966 | Aoki | 117/11 |
| 3,387,989 | 6/1968 | West et al. | 117/76 |
| 3,496,001 | 2/1970 | Minobe et al. | 117/135.5 |

*Primary Examiner*—William J. Van Balen
*Attorney*—James E. Bryan

[57] ABSTRACT

This invention relates to a process for the production of a gas-permeable multilayer sheet material, and to the material so produced, the process comprising applying a liquid layer of a solution of a polymer in a water-miscible solvent to the surface of a moving web of fiber fleece which is free from chemical binders and allowing part of the solution to penetrate into the fleece; incorporating an aqueous dispersion of synthetic material in the fleece from the uncoated surface thereof, the dispersing phase of the dispersion acting as a coagulating agent upon part of the polymer solution contained in the fleece; causing a coagulating agent to act upon the liquid layer of polymer solution on the surface of the fleece, upon the still uncoagulated portion of the polymer solution in the fleece, and upon the dispersion of synthetic material contained in the fleece; removing any excess of coagulating agent and solvent, and drying the multilayer sheet material.

6 Claims, 2 Drawing Figures

PATENTED FEB 1 1972    3,639,146

INVENTORS
KLAUS ANDRÄ
HERBERT PORRMANN
ELFRIEDE HUTSCHENREUTER

BY  *James E. Bryan*

ATTORNEY

PROCESS FOR THE PRODUCTION OF A MULTILAYER SHEET MATERIAL

The present invention relates to a process for the continuous production of a flexible, gas-permeable multilayer sheet material based on a chemically bonded, porous fiber fleece carrying an outer layer of polymer material of microporous structure, in particular a polymer material based on polyurethane.

Further, the invention relates to a gas-permeable multilayer sheet material with a microporous outer layer produced by this process.

Gas- and water vapor-permeable multilayer sheet materials normally consist of a chemically bonded fiber fleece, which may be reinforced by needling, as the supporting material, and an air- and water vapor-permeable top coating of polymer material on one surface of the fleece. In most cases, the microporous top coating consists of a polyurethane polymer.

Known processes for the production of such materials comprise, in principle, two process steps, viz bonding the fiber fleece by incorporation of cementing substances, and forming the top coating by coating one surface of the chemically bonded fleece with a polymer solution which is then converted into the microporous top coating. However, it is not economical to perform these processes separately. Further, by the known process, multiplayer sheet materials are produced which consist of separate layers, i.e., the chemically bonded fleece and the microporous top coating. By this combination of different layers and the structure of the multilayer sheet material, materials of this type manufactured by known processes possess mechanical properties which are substantially different from and less advantageous than those of natural leather. Natural leather is a fibrous material whose structure changes gradually over the cross section of the leather. This structure is responsible for the advantageous properties of natural leather.

As compared with natural leather, the multilayer materials produced by known processes, which are distinguished in that their structure comprises several individual layers, have the disadvantage that they do not behave like leather under bending and buckling stresses, they lack the softness and flexibility of leather, and the individual layers tend to disintegrate.

The present invention provides an economical process for the continuous production of a multilayer sheet material of the type here in question, which does not have the disadvantages mentioned above. Further, in the present invention, the fleece is bonded by means of substances which are physiologically inert and do not involve the danger of fire or explosion.

In the present process for the production of a gas-permeable multilayer sheet material a liquid layer consisting of an elastomer in an organic fluid solvent is applied to the surface of a fleece, and an agent capable of bonding the fleece is incorporated in the fleece, and the elastomer solution is coagulated. In a first process step, a liquid layer consisting of a solution of an elastomer in a water-miscible organic solvent is continuously applied to the surface of a web of fiber fleece which is free from chemical binders and is continuously advanced at a steady rate in the direction of the web, allowing part of the solution to penetrate into the fleece. In a subsequent second process step, an aqueous dispersion of an elastic organic polymer is continuously incorporated in the fleece from the uncoated surface thereof, with the dispersing agent of the synthetic dispersion acting as a coagulating agent for part of the elastomer solution contained in the fleece. In a third process step, a coagulating agent is caused to act continuously and simultaneously upon the liquid layer of elastomer solution on the surface of the fleece, upon the still uncoagulated portion of the elastomer solution in the fleece, and upon the dispersion of elastic organic polymer contained in the fleece. In a fourth process step, any excess of coagulating agent and solvent is removed by washing the multilayer sheet material, and, in a fifth process step, the multiplayer sheet material thus produced is dried.

Further, the invention provides a multilayer sheet material comprising a fiber fleece having a microporous outer layer of elastomer material, the outer layer being followed in the direction towards the interior of the fleece by a first zone comprising substantially fiber fleece intermingled with an elastomer binder of microporous structure, the first zone bordering on a second zone comprising substantially fiber fleece in which an elastomer binder material of microporous structure and a spongelike mass of elastic polymer are contained together, and the zone extending to the other surface of the multilayer sheet material comprising substantially fiber fleece bonded by the spongelike elastic polymer mass.

The aqueous dispersion of a synthetic elastic organic polymer used is preferably an aqueous dispersion of a synthetic rubber.

Suitable organic elastomers are the organic polymers described on page 154 of the "Textbook of Polymer Chemistry" by Billmeyer, New York, 1957. Since in the first process step of the present invention, elastomers are applied which differ in their chemical structure from the elastomers used in the second process step, the compounds used in the second process step are designated as "elastic polymers" in order to distinguish them more clearly from the first-applied compounds.

The gas0permeable multilayer sheet material produced according to the process of the invention consists of a fiber fleece carrying a microporous outer layer of polyurethane, and, in the direction towards the interior of the fleece, this outer layer is followed first by a zone which consists substantially of fiber fleece intermingled with polyurethane binder of microporous structure. This latter zone borders on a zone which consists of fiber fleece in which polyurethane binder of microporous structure and a spongelike elastic mass which consists of the elastomer, preferably of synthetic rubber, are contained together, and the zone extending to the other surface of the multilayer sheet material consists substantially of fiber fleece bonded by said elastic mass.

In this connection, the term "substantially" means that the polymer binder material in question is highly preponderant in the respective zone, but that the zone also contains a small proportion of a chemically different second polymer binder. In the present case, the binder which is present in a smaller proportion is not distributed in this zone in a statistically uniform distribution, but increases steadily in concentration from the outside to the inside. The expression "from the outside to the inside" means in the direction from the surface of the fleece to its interior. The transition from the two zones with highly preponderant proportions of one of the two binders to the intermediate zone, in the center of which the two binders are present in substantially the same concentration, proceeds steadily towards the point where the two binders are present in substantially equal concentrations.

Figure 2:
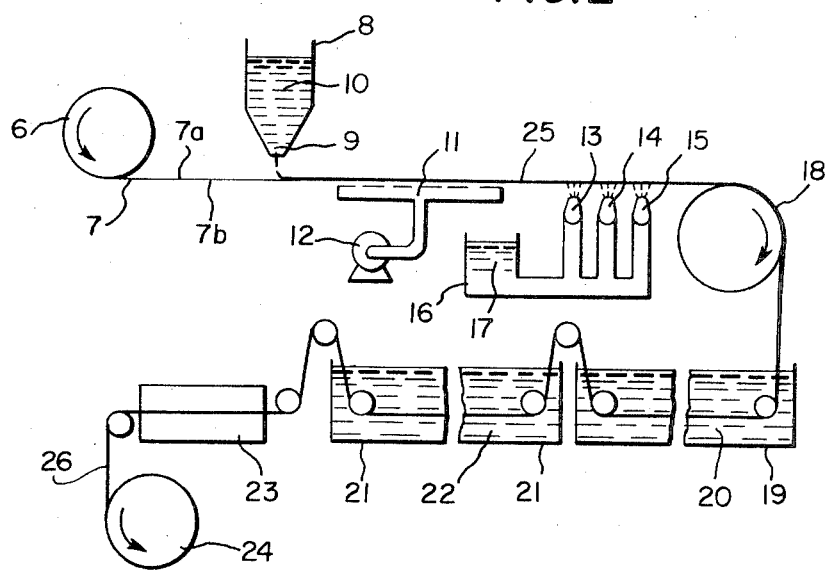

The invention will be further illustrated by reference to the accompanying drawings in which:

FIG. 1 is a diagrammatic illustration showing in cross section, the structure of a multilayer sheet material produced by the process of the invention, and FIG. 2 is a schematic flow diagram of the process.

In FIG. 1, the numeral 1 designates the microporous polyurethane top coating; 2 is that zone of the fleece which substantially contains polyurethane as the polymer binding material of microporous structure; the numeral 3 designates a fleece zone of the multilayer sheet material which borders on zone 2 and in the center of which polyurethane and an elastic organic polymer of a different chemical composition, e.g., synthetic rubber, are present in about equal proportions, while the equilibrium of binder concentration changes in such a manner that, in the direction of the polyurethane-coated fleece surface, the concentration of polyurethane steadily increases, while it steadily decreases in the opposite direction. Numeral 4 designates a zone of the multilayer sheet material which substantially contains an elastic polymer as the binder which is chemically different from polyurethane, and 5 designates one of the fibers of the fleece.

By the process of the invention, a multilayer sheet material with a microporous top coating can be produced which, as compared with materials of this type produced by known processes and composed of individual layers, i.e., materials in which there are distinct boundary surfaces between the individual layers of different composition, shows an improved flexibility and softness of the material and a behavior which resembles that of leather under buckling and bending stresses. The gas-permeable multilayer sheet material manufactured according to the invention has a water vapor permeability in the range from 1 to 10 mg./cm.$^2$ per hour. Its permeability to air ranges from 100 to 1000 liters/dm.$^2$ within 24 hours. Due to its good tensile strength, tear resistance and bond strength, the multilayer sheet material produced in accordance with the invention is excellently suited for the production of upholstery covers, shoe uppers and garments.

The process of the invention is performed by continuously applying, as a first process step, a liquid layer of an elastomer solution to the surface of a web of fiber fleece which may be needled, if desired, and which is fed at a constant rate in the direction of the web. The elastomer solution penetrates partially into the fleece. It may be of advantage to accelerate the penetration of the elastomer solution into the fleece by applying reduced pressure to the surface of the fleece opposite to the one coated with the elastomer solution. The term "partial penetration of the elastomer solution into the fleece" means that the solution penetrates evenly into the fleece over the entire coated surface thereof, but instead of completely soaking it, penetrates only to a certain depth, which is in the range from 10 to 90 percent of the thickness of the fleece. With increasing depth of penetration, the concentration of the solution in the fleece diminishes steadily, but is substantially the same at the same depth of penetration.

The penetration of the elastomer solution into the interior of the fleece may be assisted by the action of reduced pressure upon the surface of the fleece away from the coated surface. The quantity of elastomer solution applied per unit area of the fleece surface is adjusted such that, after penetration of the polymer solution into the interior of the fleece within the range given above, a layer remains on the surface of the fleece whose thickness facilitates the formation of a microporous top coating of a thickness of 100 to 800$\mu$, preferably from 200 to 400$\mu$.

In a second process step, the uncoated surface of the web of fiber fleece, which still advances at a steady rate, is then continuously coated, by means of known devices, such as slotted tubes or spraying nozzles, with an aqueous dispersion of a synthetic organic elastic polymer, the quantity and viscosity of which are selected such that it penetrates to the desired depth into the fleece without forming a separate top coating on the surface thereof. The elastomer contained in the dispersion differs in its chemical composition from the elastomer contained in the elastomer solution.

The "desired depth" of penetration of the polymer means that the polymer is allowed to penetrate into the interior of the fleece until a zone is formed in which the two chemically different polymer binders are present in substantially equal proportions. In that zone of the fleece interior in which the two types of binders, viz the aqueous dispersion of the elastic polymer and the solution of the elastomer, are present together, the elastomer is precipitated from the elastomer solution by the action of the dispersing agent contained in the dispersion of the elastic polymer and assumes a microporous shape.

In a third process step, the thus coated and impregnated web, which still advances at a steady rate in the direction of the web, is continuously introduced into a trough filled with fluid coagulating agent. By the simultaneous action of the coagulating agent on the liquid layer of elastomer solution disposed on the surface of the fleece and on the elastomer solution contained in the fleece, as also on the aqueous dispersion of elastic polymer, the dissolved elastomer and the dispersed elastic polymer contained in the dispersion—which differs chemically from the dissolved elastomer—are simultaneously coagulated and consolidated. The coagulating liquid has a temperature in the range of 20° to 80° C. After this treatment, the web of fiber fleece is introduced into another trough where excess coagulating liquid and solvent are removed by washing with a washing liquid, e.g., water, and the web is finally conducted through a drying apparatus and dried.

Suitable fleeces for use in the process of the invention are fiber fleeces based on synthetic and/or natural fibers, which may be needled for reinforcement.

The fibers of the fleece may be irregularly arranged, or they may be oriented substantially in one direction. Their thickness ranges from 0.5 to 5 denier, and is preferably in the range from 1 to 2 denier; their length ranges from 1 to 100 mm., preferably from 20 to 50 mm.

In the case of synthetic fibers, all or part of them may be heat shrinkable. The fleece also may consist of mixtures of fibers, e.g., mixtures of fibers of chemically different compositions or mixtures of chemically different or identical synthetic fibers with natural fibers. The weight per unit area of the fleeces in the range from 100 to 500 g./m.$^2$, in particular from 200 to 300 g./m.$^2$.

While in the process of the invention is performed, the web of fiber fleece is advanced in the direction of the web at a constant speed of 0.5 to 20 m./min., preferably at a speed in the range of 1 to 3 m./min.

Suitable elastomers for the preparation of the top coating and for partial binding of the fleece are: polyurethanes prepared from di- or polyisocyanates and long-chain diol compounds based on polyethers, polyesters or polyether esters having molecular weights from 500 to 5000, preferably from 1000 to 2000, and low-molecular weight chain-extending groups containing at least two active hydrogen atoms, such as diols, hydrazine, amino alcohols, or water.

The elastomer solution has a solids content from 5 to 30 percent by weight, preferably from 10 to 20 percent by weight, calculated on the weight of the total solution. The solution was a viscosity from 500 to 10,000 cp. at 25° C.

The following organic elastomeric polymers may be used in aqueous dispersions: polychloroprene, polybutadiene, polyacrylic acid esters, copolymers of butadiene and acrylonitrile, of butadiene, styrene, and acrylonitrile, of vinyl acetate and acrylic ester, which may be modified by unsaturated carboxylic acids, such as acrylic acid or methacrylic acid. Natural rubber latex also may be used. The aqueous latices may contain adjuvants, such as stabilizers, emulsifiers, plasticizers, dyestuffs and vulcanizing agents.

The dispersion of the organic elastic polymer has a solids content in the range of 10 to 50 percent by weight, in particular of 15 to 20 percent by weight, based on the weight of the total dispersion.

Since most commercially available dispersions of organic elastic polymers are of the anionic type, in which the polymer particles carry negative charges in order to guarantee the stability of the latices, and since the aqueous dispersing medium normally exhibits an alkaline reaction, the dispersions may be coagulated by the addition of acids or of substances having an acid reaction. Therefore, the coagulating bath comprises dilute mineral acids (2 to 10 percent hydrochloric acid or sulfuric acid) or aqueous solutions of organic acids (formic acid, acetic acid, for example), or solutions of readily hydrolyzable salts yielding an acid reaction (e.g., 5 to 40 percent, preferably 5 to 10 percent solutions of ammonium chloride, aluminum sulfate, and the like). The temperature of the coagulating bath is in the range of 20° to 80° C. Alternatively, the latices may be coagulated by organic solvents (such as ethyl alcohol or acetone). The coagulating agents and excess of solvents are removed by washing with water at a temperature of 20° to 80° C.

In FIG. 2, the numeral 6 designates a magazine roll from which the web of fiber fleece 7, whose surfaces are designated at 7a and 7b, is continuously unwound. Numeral 8 designates a storage tank mounted above the surface 7a of the web and provided with a slotlike opening 9 at its lower end.

The slot 9 extends vertically to the direction of feed of the web, and its length corresponds substantially to the width of the web. Numeral 10 designates a liquid polyurethane solution contained in the storage tank 8; 11 is a supporting grid provided with a suction device 12. Numerals 13, 14, and 15 designate means for spraying an aqueous dispersion of an elastic polymer upon the surface 7b of the web of fiber fleece. Numeral 16 designates a reservoir for the liquid dispersion 17, 18 is a guide roll, 19 is a trough containing the fluid coagulating agent 20, and 21 is a trough containing a liquid 22 for washing the fiber fleece. Numeral 23 designates a heating channel, and 24 designates a roll upon which the finished coated laminate is would up. Numeral 25 is the web of fiber fleece carrying the still liquid layer on its surface. Numeral 26 designates the final multilayer sheet material according to FIG. 1.

The process is continuously performed by drawing the needled fiber fleece from the magazine roll 6 and providing it on its surface 7a with a liquid layer consisting of the polyurethane solution 10 issuing from the casting slot 9 of the storage tank 8.

The coated fleece is then guided over a planar, horizontally positioned sievelike suction plate 11 to which reduced pressure is applied from below by means of a suction device 12. After leaving the suction plate, the surface 7b of the fleece is thoroughly treated with an aqueous dispersion of an elastic polymer sprayed from a series of spraying nozzles 13, 14, and 15. Subsequently, the treated web passes through a trough 19 containing a fluid coagulating agent 20, and, after termination of the coagulating process, enters a trough 21 containing the washing fluid 22. After the washing process, the web of fiber fleece leaves the trough 21, enters the heating channel 23, and, after drying, is finally wound up as the finished multilayer sheet material 26 on a magazine roll 24.

The invention will be further illustrated by the following examples:

EXAMPLE 1

A matted fiber fleece produced by the carding process from polyester fibers of a thickness of 3 denier and a staple length of 40 mm., which had been reinforced by needling at a density of 200 stitches per $cm.^2$ and weights 260 $g./m.^2$, is continuously coated on one surface with a polyurethane solution.

The polyurethane solution is prepared by reacting 14.3 kg. of a linear polyester with an OH number of 75, obtained from adipic acid and 4,4'-dihydroxy-dibutyl ether, for 30 minutes, with agitation and at a temperature of 100° C., with 5 kg. of diphenylmethane-4,4'-diisocyanate (DESMODUR, a product of Farbenfabriken Bayer, Leverkusen, Germany). The prepolymer thus produced, which has an NCO content of 4.19 percent by weight, is dissolved in 20 kg. of dimethyl formamide and then a mixture of 0.9 kg. of carbon black, 0.2 kg. of water, and 2.3 kg. of dimethyl formamide is added. With constant stirring, a viscous solution is formed which, after dilution with 70 kg. of dimethyl formamide, has a viscosity of 6000 cp. at 25° C.

From the slot in the casting box, the polyurethane solution is applied as a 2.4 mm. thick layer to one surface of the web of fiber fleece fed at constant speed of 2 meters per minute.

In order to facilitate the penetration of the polyurethane solution into the fleece, the fleece is conducted with its underside in close contact with a sievelike suction plate to which a vacuum is applied by means of a pump. After the polyurethane solution has been suctioned for about 5 minutes into the zone of the fleece beneath the surface thereof and has penetrated it, a 16 percent by weight aqueous dispersion based on a butadiene-acrilonitrile copolymer (SYNTOMER CD 1-80-3, a product of Metallgesellschaft, Frankfurt/M., Germany) is continuously applied, to the point of saturation, to the underside of the coated fleece by means of a number of slotted tubes disposed beneath the fleece web and the orifices of which are aimed at the underside of the fleece.

The web of fiber fleece, which now carrier a layer of polyurethane solution on one surface, is conducted around a guide roll and introduced into a coagulating bath consisting of a 5 percent by weight aqueous aluminum sulfate solution at a temperature of 30° C., which it leaves after the binder material and the top coating have solidified. Excess dimethyl formamide and salt solution adhering to the web then are removed by washing. The multilayer sheet material thus produced is dried in a drying apparatus, cooled, and finally wound up on a magazine roll. The multilayer sheet material thus produced is of the structure diagrammatically shown in FIG. 1, and is distinguished by a smooth surface, pleasing softness and flexibility, and high resistance to bending and buckling stresses. After the conventional finishing processes, the material may be used for the production of shoe uppers. The water vapor permeability of the material is 5 $mg./cm.^2$ per hour; its permeability to air is 550 $l./dm.^2$ within 24 hours.

EXAMPLE 2

The procedure described in example 1 is repeated, with the exception that the surface of the web of fleece away from the polyurethane-coated side is sprayed from below with a 20 percent by weight aqueous dispersion of a terpolymer of vinyl acetate, butyl acrylate and allyl acetoacetate until the fleece is saturated. The thus-treated web is then introduced into a 10 percent by weight aqueous solution of hydrochloric acid at a temperature of 20° C., thus causing simultaneous coagulation of the polyurethane and the terpolymer. After the fleece has been washed in a trough filled with water and dried, a soft, flexible material of good permeability to air and water vapor is obtained. The water vapor permeability of the multilayer sheet material is 3 $mg./cm.^2$ per hour; its permeability to air is 400 $l./dm.^2$ within 24 hours.

EXAMPLE 3

The procedure described in example 1 is repeated, with the exception that the aqueous polymer dispersion used for soaking the fleece is a 20 percent by weight dispersion of a terpolymer based on butadiene, acrylonitrile, and methacrylic acid (PERBUNAN 4M, a produce of Farbenfabriken Bayer, Leverkusen, German).

For the simultaneous coagulation of the polyurethane solution and the aqueous terpolymer dispersion, the impregnated web is introduced into a bath containing a saturated aqueous solution of aluminum sulfate which has been heated to 65° C. After leaving the bath, the web is washed in a flexibility filled with water and then dried. The material thus obtained is distinguished by a good tear resistance and tensile strength, is very flexible, and may be used for the production of upholstery covers. The water vapor permeability of the multilayer sheet material thus obtained is 6 $mg./cm.^2$ per hour and its air-permeability is 700 $l./dm.^2$ within 24 hours.

EXAMPLE 4

The procedure described in example 3 is repeated, using, however, ethyl alcohol at a temperature of 25° C. as the coagulating agent. The polyurethane solution and the terpolymer dispersion coagulate in a very finely divided form and thus impart to the material an excellent flexibility and pleasant leathery feel. The material is highly suitable for the production of garments. The water vapor permeability of the multilayer sheet material is 8 $mg./cm.^2$ per hour; its permeability to air is 75 $l./dm.^2$ within 24 hours.

It will be obvious to those skilled in the art that many modifications may be made within the scope of the present invention without departing from the spirit thereof, and the invention includes all such modifications.

What is claimed is

1. A process for the production of a gas-permeable multilayer sheet material which comprises applying a liquid layer of a solution of an elastomer in a water-miscible organic solvent to the surface of a moving web of fiber fleece which is free from chemical binders and allowing part of the solution to penetrate into the fleece, incorporating an aqueous dispersion of an elastic polymer in the fleece from the uncoated surface thereof, the dispersing phase of the dispersion acting as a coagulating agent upon part of the elastomer solution contained in the fleece, causing a coagulating agent to act upon the liquid layer of elastomer solution on the surface of the fleece, upon the still uncoagulated portion of the elastomer solution in the fleece, and upon the dispersion of the elastic polymer contained in the fleece, removing any excess of coagulating agent and solvent, and drying the multilayer sheet material.

2. A process according to claim 1 in which the process is performed continuously.

3. A process according to claim 1 in which one of the surfaces of the fleece is coated with a solution of a polyurethane and the aqueous dispersion of elastic polymer is based on a synthetic rubber.

4. A process according to claim 1 in which after one of the surfaces of the fleece has been coated with the elastomer solution, the opposite surface is subjected to reduced pressure.

5. A multilayer sheet material comprising a fiber fleece having a microporous outer layer of elastomer material, the outer layer being followed in the direction towards the interior of the fleece by a first zone comprising substantially fiber fleece intermingled with an elastomer binder of microporous structure, the first zone bordering on a second zone comprising substantially fiber fleece in which an elastomer binder material of microporous structure and a spongelike mass of elastic polymer are contained together, and the zone extending to the other surface of the multilayer sheet material comprising substantially fiber fleece bonded by the spongelike elastic polymer mass.

6. A multilayer sheet material according to claim 5 in which the microporous outer layer and the binder of microporous structure are formed from a polyurethane.

* * * * *